US007725351B1

(12) United States Patent
Williams

(10) Patent No.: US 7,725,351 B1
(45) Date of Patent: May 25, 2010

(54) POINT OF SALE SYSTEM INTERFACE FOR PROCESSING OF TRANSACTIONS AT A SECONDARY TRANSACTION PAYMENT NETWORK

(75) Inventor: Mark Williams, Tucker, GA (US)

(73) Assignee: RBS Lynk Incorporated, Atlanta, GA (US)

( * ) Notice: Subject to any disclaimer, the term of this patent is extended or adjusted under 35 U.S.C. 154(b) by 687 days.

(21) Appl. No.: 11/380,275

(22) Filed: Apr. 26, 2006

(51) Int. Cl.
*G06Q 40/00* (2006.01)
(52) U.S. Cl. .............................. 705/16; 705/26; 705/35; 705/38; 705/39; 705/42; 235/7 R
(58) Field of Classification Search ................... 705/16, 705/26, 35, 39, 42, 38; 235/7 R
See application file for complete search history.

(56) References Cited

U.S. PATENT DOCUMENTS

| 6,272,529 | B1* | 8/2001 | Lum .......................... 709/203 |
| 6,547,132 | B1 | 4/2003 | Templeton et al. |
| 6,886,742 | B2* | 5/2005 | Stoutenburg et al. ........ 235/379 |
| 7,469,826 | B2* | 12/2008 | Ciancio et al. .............. 235/383 |
| 2002/0138428 | A1* | 9/2002 | Spear .......................... 705/41 |
| 2004/0054622 | A1* | 3/2004 | Strayer et al. ................. 705/39 |
| 2005/0077350 | A1* | 4/2005 | Courtion et al. ............. 235/380 |
| 2006/0253390 | A1* | 11/2006 | McCarthy et al. ............. 705/39 |

OTHER PUBLICATIONS

Hunt, R., Antitrust Issues in Payment Card Networks: Can They Do That? Should We Let Them? Business Review—Federal Reserve Bank of Philadelphia, Philadelphia: Second Quarter 2003. p. 14.*
Cohen, St., "Big Three" in Internet Payments Emerge., Bank Technology News. New York: May 1998. vol. 11, Iss. 5; p. 1, 3 pgs.*

* cited by examiner

*Primary Examiner*—Stefanos Karmis
(74) *Attorney, Agent, or Firm*—Standley Law Group LLP

(57) ABSTRACT

An interface for an integrated POS solution that allows a merchant to process card payment transactions through a secondary transaction payment processing network. The interface of the present invention expands the functionality of POS system by expanding the scope of use of a secondary port in the POS system. A primary POS port connects to a primary transaction payment processing network and a secondary POS port connects via an interface to an Internet payment gateway and then to a secondary transaction payment processing network. The interface converts the secondary port message formats into a message format for processing through an Internet payment gateway and secondary transaction payment processing network. The interface also performs additional reasonability and security checks typically not performed by a secondary port on cardholder track data. The improved processing of track data results in fewer declines so that transactions are processed more efficiently and accurately.

18 Claims, 1 Drawing Sheet

POINT OF SALE SYSTEM INTERFACE FOR PROCESSING OF TRANSACTIONS AT A SECONDARY TRANSACTION PAYMENT NETWORK

CROSS REFERENCES TO RELATED APPLICATIONS

None.

FIELD OF THE INVENTION

The present invention relates generally to point-of-sale (POS) systems. In particular, the present invention is an interface that is part of an integrated POS solution that supports processing of transactions at a secondary transaction payment processing network.

BACKGROUND OF THE INVENTION

Many consumers today prefer the convenience of using a payment card such as a credit card or debit card rather than cash to pay for POS transactions. With sufficient credit limits or account balances, busy consumers are assured of having access to adequate funds to make as many purchases as they may need to make within a day, a week, a month, etc. In some instances, consumers may purchase more items than they intended simply because the payment card provides the means to do so. The cards obviate the need to carry cash or even determine how much cash might be needed when visiting a particular retail establishment. Furthermore, the cards offer consumers protection if lost or stolen.

In response to consumer preferences to use payment cards, most merchants today are willing to accept cards even though they may be charged fees for accepting such types of payments. The increased spending power provided by payment cards may result in higher per visit charges that offset the costs associated with the acceptance of the cards. Consumers may be reminded of items they need while shopping or simply make additional purchases on impulse. As a result, consumers may purchase more items with payment cards than they would if paying cash.

POS vendors have responded to consumer preferences to use payment cards by offering merchants equipment that is designed to accept various types of payment cards and automate the processing of the transaction through a POS system and a transaction payment processing network. In many instances, the equipment includes a card reading device that accepts the card directly from the consumer and prints a receipt for the consumer upon completion of the transaction.

In the Petroleum/Convenience Store Industry, standard equipment includes a PC-based integrated POS application. This POS application links the indoor point-of-purchase devices and the outdoor pay-at-the-pump (automated fuel pumps) devices. This POS application allows the station or store operators to control all sales for the location in one application. For POS application indoor payment card transactions, one of two paths is typically followed. In one path, the cardholder presents his/her card to an operator. The operator swipes the card through a card reader that captures the magnetic "track" data on the card. The operator then enters the final amount of the transaction and processes the payment transaction. The second path is similar, but the cardholder swipes the card on a "PIN Pad" accessible to the cardholder. The operator then enters the final amount of the transaction and processes the payment transaction. In both types of transactions, the account data may be entered manually.

To use the POS application outdoors for a payment card transaction, the cardholder swipes the card through a card reader within the pay-at-the-pump device. The device captures the magnetic "track" data on the card. The normal flow then sends the payment transaction information to the integrated POS application. An authorization request is then sent to the transaction payment processing network. If the authorization is approved by the network, then the approved response is transmitted back to the integrated POS application and thus to the pay-at-the-pump device. The pump is then enabled and the cardholder selects a grade of fuel, inserts the nozzle, pumps the fuel, and returns the nozzle. When the pay-at-the-pump device senses that the nozzle has been returned, it prints a receipt for the cardholder and sends the final amount of the payment transaction to the integrated POS application and then to the network for settlement.

Although integrated POS applications are in widespread use today, they are typically limited to accepting only those cards that operate with the transaction payment processing network selected by the merchant. The devices at a particular store are configured to operate with a certain transaction payment processing network and therefore, accept and process only transactions that conform to the requirements of the selected transaction payment processing network. Transactions that do not conform to the requirements of the payment processing network cannot be processed through the fuel pump device. The inability to accept cards from other vendors or other types of cards at the fuel pump may result in lost business to the petroleum/convenience store merchant. Consumers that do not have the type of payment card accepted by the merchant are required to pay cash or pay by check for purchases. They may limit their purchases as a result or simply choose to frequent a different merchant.

Some attempts to accept other types of payment cards have been made. For example, the Mannatec® port that operates with Verifone® Ruby SuperSystem® POS system was designed to handle small issue/small volume proprietary cards, using a limited card format, with limited reasonability checks. An example of a small issue/small volume card is a "Metro Area Card" distributed to government workers of a 100K resident metro area. The government might sign an agreement with a local "ABC" service station to accept the Metro Area Card for all the municipal vehicles. This custom proprietary card may be accepted by the ABC station and related transactions processed out the secondary port to a local negative file containing account numbers of cards that should not be approved. All other transactions involving the Metro Area Card are approved and may result in the acceptance of fraudulent transactions. Use of the secondary port is typically limited to such types of cards and with very limited, local validation.

The inability to accept certain types of payment cards at many petroleum/convenience stores is disadvantageous to merchants and consumers. Therefore, there is a need for an integrated POS solution for petroleum/convenience store merchants that can accept cards and related transaction data for a secondary transaction payment processing network.

SUMMARY OF THE INVENTION

The present invention is an interface for an integrated POS solution that allows a merchant to process card payment transactions through a secondary transaction payment processing network. The interface of the present invention expands the functionality of a POS system by expanding the scope of use through a secondary port in the POS system. The secondary port is used to accept major cards even though in most POS systems it was designed to handle small issue/small volume proprietary cards, using a limited card format, with limited reasonability checks.

In an example embodiment of the present invention, a primary POS port connects to a first or primary transaction payment processing network and a secondary POS port connects via an interface to an Internet payment gateway and then to a secondary transaction payment processing network. The interface converts the secondary port message formats into a message format for processing through an Internet payment gateway, secondary transaction payment processing network, and secondary host. The interface also performs additional reasonability and security checks typically not performed by a secondary port on cardholder track data. The improved processing of track data results in fewer declines so that transactions are processed more efficiently and accurately.

DESCRIPTION OF EXAMPLE EMBODIMENTS

Figure 1:
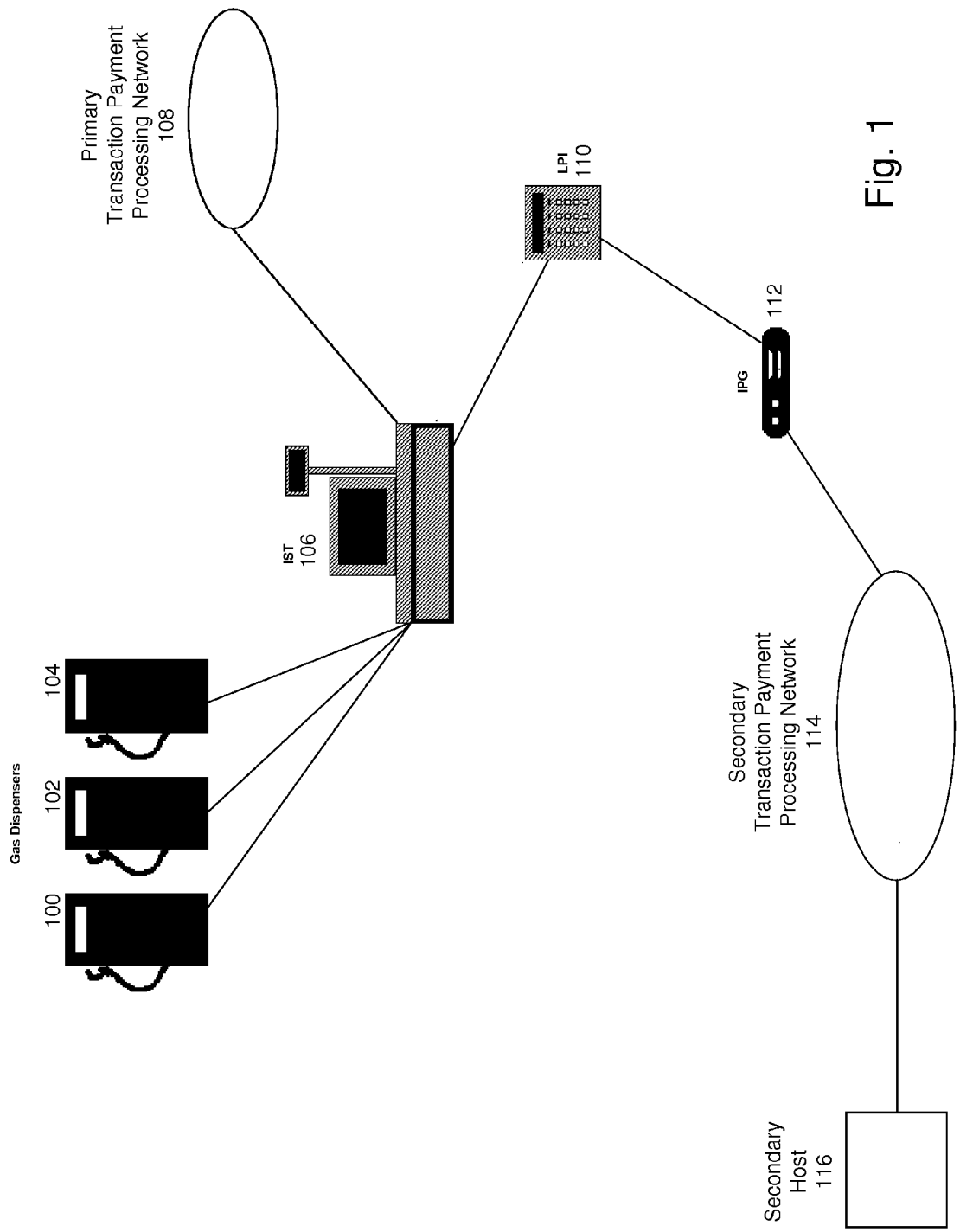
FIG. 1 is a block diagram of an integrated POS solution with an interface according to an example embodiment of the present invention.

Referring to FIG. 1, a block diagram of an integrated POS solution with an interface according to an example embodiment of the present invention is shown. A plurality of gas dispensers or pumps 100, 102, 104 comprising payment card readers are connected to an in-store POS system 106. In an example embodiment of the present invention, the in-store POS system 106 comprises two ports. A primary POS port connects to a first or primary transaction payment processing network 108 and a secondary POS port connects via an interface 110 to an Internet payment gateway 112, to a second transaction payment processing network 114, and to a secondary host 116 that accepts or declines the transaction and returns an action code indicative of the host response. Multiple secondary host computers operated by different payment card authorizers may be accessible to the transaction payment processing network 114. The types of card processed through the transaction payment processing network may determine which secondary hosts are accessed by the network.

An application at the POS system 106 determines which port, the primary or the secondary, to use when processing financial transactions. The interface 110 comprises software for receiving transaction data from the secondary port at the POS 106, transmitting data to the transaction payment processing network 114 via the Internet payment gateway 112, receiving confirmation data from transaction payment processing network 114, and transmitting action code data to the POS 106 via the secondary port. In an alternative embodiment of the present invention, a modem connection to a payment processing network 114 rather than an Internet payment gateway 112 is used. A system that uses a modem connection may be appropriate for a merchant that wants to process gift cards, JCB cards, or other types of cards at the secondary transaction payment network rather than large volume cards.

The interface of the present invention allows a merchant to take advantage of a second port such as a Mannatec® port that operates with Verifone® Ruby SuperSystem® POS system. By using two ports of the in-store POS system 106, a merchant can send card transactions for one category of cards to a first primary transaction payment processing network 108 and card transactions for a second category of cards to a secondary transaction payment processing network 114 and secondary host 116.

The in-store POS system 106 processes data from a PIN pad or bar code reader and routes appropriate traffic to the secondary port and from the secondary port to a port on the interface 110 using a serial cable. The ports at the in-store POS system and interface may be serial ports such as RS-232 ports that are connected using a serial cable.

Transaction message formats such as the following may be exchanged between the in-store POS system 106 and the interface 110:

1. pay at the pump authorizations and captures;
2. inside sales;
3. voids; and
4. administrative transaction related to settling a batch of transactions.

The interface 110 software functions as a controller or switch. It accepts transaction data from a secondary port and converts it into a format for processing at the secondary host 116. Additionally, it tracks the secondary host's 116 communication restrictions and protocols. The software maintains a table of pump authorization dollar limits for each card type sent to the secondary host 116. The software maintains running totals of all processed transactions and forwards the information to the secondary host 116 so that the secondary host 116 can complete a settlement process. The software performs a batch close at specific times established by the merchant and the secondary host.

The ability to process different categories of card transactions using a primary and a secondary payment processing network is beneficial to merchants of petroleum/convenience stores. For example, a merchant that is changing oil companies may need to accept the current oil company payment cards for a limited period of time. The POS system may be configured to process all transactions for the current oil company payment card on the primary port and primary transaction payment processing network 108 for authorization and transaction capture. The POS system may process major credit card transactions through the secondary port and interface 110 and thus to the secondary transaction payment processing network 114 for authorization and capture at the secondary host 116.

In another example, a merchant that operates different stores under different brand names may use the present invention to accept a particular gift card at all stores. The merchant may have 10 stores that are branded "ABC," 10 stores that are branded "DEF," and 10 stores that are branded "GHI." The payment traffic for all three companies (i.e., ABC, DEF, and GHI) may be processed through the primary ports for authorization and capture. The merchant may further want to accept at all 30 stations a custom gift card issued by a third party. All 30 sites transmit transactions for the custom gift card out the secondary port of the POS system to the interface 110 and thus to the secondary transaction payment processing network 114 for authorization and capture at the secondary host 116. The ability to use multiple ports and transaction payment processing networks allows the merchant to accept more types of payment cards. The ability to accept many types of payment cards may then make the merchant's place of business more appealing to customers.

The interface of the present invention expands the functionality of POS system secondary ports by expanding their scope of use.

With the present invention, major credit card transactions, which are typically not processed using a secondary port, are transmitted to the interface 110 that converts the secondary port transaction data into a message format for processing through an Internet payment gateway 112, a secondary transaction payment processing network 114, and a secondary host 116. The interface 110 also performs additional reasonability and security checks typically not performed by a secondary port on cardholder track data. Action codes that are returned from payment card authorizers (which operate secondary hosts) through the transaction payment processing network 114 are analyzed for more efficient and accurate processing. Different display messages are transmitted back to the pump devices 100, 102, 104 when certain action or response codes are received from the secondary transaction payment processing network 114. In some cases, a cardholder may be asked to go inside the store and complete a manual transaction. In an example embodiment of the present invention, the improved processing of track data results in four declines out of 1,000 transactions rather than 20 declines out of 1,000 transactions using other methods.

Transactions checks performed by the interface 110 may include the following:
1. expiration date;
2. card length minimum/maximum;
3. modulus 10 checks; and
4. card type by bank identification number (BIN) range.

The interface 110 also distinguishes between inside transactions entered at a console POS device 106 and outside transactions entered at a pay-at-the-pump POS device 100, 102, 104. The ability to distinguish such transactions results in the ability to improve outside transaction processing. For example, pay-at-the-pump POS devices 100, 102, 104 often inadvertently drop one of the control characters at the end of the track data on outside payment transactions. In these cases, the transactions are sent to the secondary host 116 and rejected with an action or response code indicating that the track data is invalid. The interface 110 recognizes the rejection for invalid track data and prompts the cardholder to try the transaction one more time. When the transaction is processed a second time, it typically completes normally without a rejection for invalid track data. In rare instances (typically 10% or less) when the interface receives the same secondary host action code indicating invalid track data, the cardholder is given a "see attendant" prompt and asked to go inside to complete the transaction.

The following tables identify various action codes that may be received from the secondary host 116 through the secondary transaction payment processing network 114. Different action codes may be received depending upon the type of card transaction that is being processed. In addition, many other types of action codes not shown in the following tables could be used in processing transactions depending on the needs of the payment card authorizers and the merchants they serve.

TABLE 1

Credit Action Codes and Response Literals

| Code | Description | Response Literal Returned |
|---|---|---|
| 0000 | Approved | APPROVED |
| 0001 | Call Voice Operator | CALL VOICE OPER |
| 0007 | Pick Up Card | PICK UP CARD |
| 1010 | Invalid Merchant Number or Check Digit | TERM ID ERROR |
| 1011 | Invalid Terminal Number | NV TERM NO |
| 1012 | Invalid Terminal Type | NV TERM TYPE |
| 1014 | Invalid Transaction Code | NV TRAN CODE |
| 1015 | Invalid or Unsupported Card Type | NV CARD TYPE |
| 1020 | Invalid Expiry Date | NV EXPIRY DATE |
| 1021 | Invalid Amount | NV TRAN AMOUNT |
| 1022 | Invalid Date or Time | NV DATE/TIME |
| 1023 | Invalid Authorization Number | NV AUTH NUM |
| 1024 | Invalid Retrieval Data | NV RETR DATA |

TABLE 1-continued

Credit Action Codes and Response Literals

| Code | Description | Response Literal Returned |
|---|---|---|
| 1025 | Not Setup For Credit Processing | SERV NOT ALLOWED |
| 1026 | Invalid Program Type | NV PROG TYPE |
| 1099 | Invalid Data Format In Request | DATA FORMAT ERR |
| All Others | Undefined | DENIED |

TABLE 2

Gift Action Codes and Response Literals

| Code | Description | Response Literal Returned |
|---|---|---|
| 0000 | Approved | APPROVED |
| 0001 | Invalid Card | INVALID CARD |
| 0004 | Card Not Active | CARD NOT ACTIVE |
| 0005 | Insufficient Funds | TRY LESSER AMT |
| 0008 | Over System Limit | OVER LIMIT |
| 0009 | Over Client Limit | OVER LIMIT |
| 0010 | Invalid Transaction | DENIED 10 |
| All Others | Undefined | DENIED |

TABLE 3

Fleet Action Codes and Response Literals

| Code | Description | Response Literal Returned |
|---|---|---|
| 0000 | Approved | APPROVED |
| 0080 | Approved - Imprint Card | APPROVED/IMPRINT |
| 0101 | Expired Card | DECLINED |
| 0104 | Restricted Card | DENIED |
| 0109 | Invalid Merchant | REFERRAL |
| 0110 | Invalid Amount | INVALID DATA |
| 0111 | Invalid Account | DENIED |
| 0116 | Insufficient Funds | DENIED |
| 0121 | Daily Dollar Limit Exceeded | DENIED |
| 0123 | Daily Frequency Limit Exceeded | DENIED |
| 0180 | Invalid Driver ID | INVALID DRIVER |
| 0181 | Invalid Vehicle ID | INVALID VEHICLE |
| 0182 | Invalid Local Date or Time | INVALID DATA |
| 0183 | Exceeds Transaction Dollar Limit | DENIED |
| 0184 | Transaction Not Voided | INVALID DATA |
| 0185 | Invalid Processing Code | REFERRAL |
| All Others | Any Undefined Action Code | REFERRAL |

The present invention is part of an integrated POS solution that allows a merchant to process some financial transactions to a first or primary transaction payment network and other financial transactions to a secondary transaction payment network. The ability to accept more card types and process more transactions results in substantial benefits to a merchant including increased revenues and greater customer satisfaction. While example embodiments of the invention have been illustrated and described, various modifications and combinations can be made without departing from the spirit and scope of the invention. For example, methods for communicating between an interface and secondary host may be modified and fall within the scope of the present invention. Modifications, combinations, and equivalents to the system and method of the present invention are intended to be covered and claimed.

What is claimed is:

1. An interface for processing a financial transaction comprising:
 a point of sale system for processing financial card transactions from a plurality of point of purchase devices comprising:
  (a) a primary port for processing financial transactions from a first category of financial card transactions at a primary transaction payment processing network; and
  (b) a secondary port for processing financial transactions from a second category of financial card transactions at a secondary transaction payment processing network;
 a first connection for connecting said interface to said secondary port of said point of sale system;
 a second connection for connecting said interface to said secondary transaction payment processing network;
 a host computer in communication with said secondary transaction payment processing network for receiving and analyzing formatted financial transaction data and returning action codes in response to said formatted financial transaction data; and
 at least one software component at said interface for processing said financial transaction by:
  (a) receiving from said secondary port at said point of sale system financial transaction data for said financial transaction, said financial transaction data originating at a point of purchase device in communication with said point of sale system;
  (b) formatting said financial transaction data from said point of sale system for processing at said host computer in communication with said secondary transaction payment processing network;
  (c) transmitting said formatted financial transaction data to said secondary transaction payment processing network for processing;
  (d) receiving from said secondary transaction payment processing network an action code returned by said host computer in communication with said secondary transaction payment processing network; and
  (e) transmitting to said point of purchase device in communication with said point of sale system a message corresponding to said action code from said host computer to complete said financial transaction.

2. The interface of claim 1 wherein said financial transaction is an outside financial transaction.

3. The interface of claim 1 wherein said financial transaction is an inside financial transaction.

4. The interface of claim 1 wherein said second connection is selected from the group consisting of Internet payment gateway connections and modem connections.

5. The interface of claim 1 wherein said financial transaction is selected from the group consisting of major credit card financial transactions, gift card financial transactions, and proprietary card financial transactions.

6. The interface of claim 1 wherein said financial transaction is selected from the group consisting of outside transaction authorizations and captures, inside sales, transaction voids, and administrative transactions related to settling batch transactions.

7. A method for processing a financial transaction at a point of sale system comprising (a) a primary port for processing a first category of financial card transactions at a primary transaction payment processing network and (b) a secondary port for processing a second category of financial card transactions at a secondary transaction payment processing network, said method comprising:
 (a) receiving from said secondary port at said point of sale system at an interface financial transaction data for said financial transaction, said financial transaction data originating at a point of purchase device in communication with said point of sale system;
 (b) formatting said financial transaction data from said point of sale system for processing at a host computer in communication with said secondary transaction payment processing network;
 (c) transmitting from said interface to said secondary transaction payment processing network for processing at said host computer said formatted financial transaction data;
 (d) receiving at said interface from said secondary transaction payment processing network an action code returned by said host computer in communication with said secondary transaction payment processing network;
 (e) transmitting from said interface to said point of purchase device in communication with said point of sale system a message corresponding to said action code from said host computer to complete said financial transaction.

8. The method of claim 7 wherein said financial transaction is an outside financial transaction.

9. The method of claim 7 wherein said financial transaction is an inside financial transaction.

10. The method of claim 7 wherein said second connection is selected from the group consisting of Internet payment gateway connections and modem connections.

11. The method of claim 7 wherein said financial transaction is selected from the group consisting of major credit card financial transactions, gift card financial transactions, and fleet card financial transactions.

12. The method of claim 7 wherein said financial transaction is selected from the group consisting of outside transaction authorizations and captures, inside sales, transaction voids, and administrative transactions related to settling batch transactions.

13. A method for processing point of sale system financial transactions comprising (1) a primary port for processing financial transactions from a first category of financial card transactions at a primary transaction payment processing network and (2) a secondary port for processing financial transactions from a second category of financial card transactions at a secondary transaction payment processing network, said method comprising:
 (a) transmitting from said secondary port at said point of sale system to an interface device financial transaction data for at least one financial transaction, said financial transaction data originating at a point of purchase device in communication with said point of sale system;
 (b) formatting at said interface device said financial transaction data for processing at a secondary host computer;
 (c) transmitting from said interface device to said secondary transaction payment processing network said formatted financial transaction data;
 (d) transmitting from said secondary transaction payment processing network to said second host computer said formatted financial transaction data;
 (e) receiving at said secondary transaction payment processing network an action code returned by said secondary host computer;
 (f) receiving at said interface device from said secondary transaction payment processing network said action code returned by said secondary host computer;

(g) transmitting from said interface to said point of purchase device in communication with said point of sale system a message corresponding to said action code from said host computer to complete said financial transaction.

14. The method of claim 13 wherein said financial transaction is an outside financial transaction.

15. The method of claim 13 wherein said financial transaction is an inside financial transaction.

16. The method of claim 13 wherein said second connection is selected from the group consisting of Internet payment gateway connections and modem connections.

17. The method of claim 13 wherein said at least one financial transaction is selected from the group consisting of major credit card financial transactions, gift card financial transactions, and proprietary card financial transactions.

18. The method of claim 13 wherein said at least one financial transaction is selected from the group consisting of outside transaction authorizations and captures, inside sales, transaction voids, and administrative transactions related to settling batch transactions.

* * * * *

UNITED STATES PATENT AND TRADEMARK OFFICE
CERTIFICATE OF CORRECTION

PATENT NO.       : 7,725,351 B1
APPLICATION NO.  : 11/380275
DATED            : May 25, 2010
INVENTOR(S)      : Mark Williams It is certified that error appears in the above-identified patent and that said Letters Patent is hereby corrected as shown below:

In Columns 5 and 6, please delete "Table 1" and insert

--TABLE 1

Credit Action Codes and Response Literals

| Code | Description | Response Literal Returned |
|---|---|---|
| 0000 | Approved | APPROVED |
| 0001 | Call Voice Operator | CALL VOICE OPER |
| 0007 | Pick Up Card | PICK UP CARD |
| 1010 | Invalid Merchant Number or Check Digit | TERM ID ERROR |
| 1011 | Invalid Terminal Number | INV TERM NO |
| 1012 | Invalid Terminal Type | INV TERM TYPE |
| 1014 | Invalid Transaction Code | INV TRAN CODE |
| 1015 | Invalid or Unsupported Card Type | INV CARD TYPE |
| 1020 | Invalid Expiry Date | INV EXPIRY DATE |
| 1021 | Invalid Amount | INV TRAN AMOUNT |
| 1022 | Invalid Date or Time | INV DATE/TIME |
| 1023 | Invalid Authorization Number | INV AUTH NUM |
| 1024 | Invalid Retrieval Data | INV RETR DATA |
| 1025 | Not Setup For Credit Processing | SERV NOT ALLOWED |
| 1026 | Invalid Program Type | INV PROG TYPE |
| 1099 | Invalid Data Format In Request | DATA FORMAT ERR |
| All Others | Undefined | DENIED-- |

Signed and Sealed this

Thirteenth Day of July, 2010

David J. Kappos
*Director of the United States Patent and Trademark Office*